United States Patent
Meritt et al.

(10) Patent No.: US 9,613,117 B1
(45) Date of Patent: Apr. 4, 2017

(54) DECLARATIVE DRIVER

(71) Applicant: Progress Software Corporation, Bedford, MA (US)

(72) Inventors: Jaime Meritt, Raleigh, NC (US); Prasanna Reddy Anireddy, Hyderabad (IN); Devesh Kumar Singh, Hyderabad (IN); Ramesh Loganathan, Hyderabad (IN); Kumar Roshan, Hyderabad (IN); Rajagopal Guduru, Hyderabad (IN)

(73) Assignee: Progress Software Corporation, Bedford, MA (US)

( * ) Notice: Subject to any disclaimer, the term of this patent is extended or adjusted under 35 U.S.C. 154(b) by 172 days.

(21) Appl. No.: 14/103,677

(22) Filed: Dec. 11, 2013

(51) Int. Cl.
*G06F 17/30* (2006.01)

(52) U.S. Cl.
CPC .............................. *G06F 17/30569* (2013.01)

(58) Field of Classification Search
None
See application file for complete search history.

(56) References Cited

U.S. PATENT DOCUMENTS

| | | | |
|---|---|---|---|
| 7,987,149 B2 | 7/2011 | Kulkarni et al. | |
| 2002/0143819 A1* | 10/2002 | Han | G06F 17/3089 715/237 |
| 2010/0057673 A1 | 3/2010 | Savov | |
| 2010/0306227 A1* | 12/2010 | Fleming | G06F 17/30286 707/763 |
| 2013/0179152 A1* | 7/2013 | Votintseva | G06F 17/2881 704/9 |

\* cited by examiner

*Primary Examiner* — Hosain Alam
*Assistant Examiner* — Tuan-Khanh Phan
(74) *Attorney, Agent, or Firm* — Patent Law Works LLP

(57) ABSTRACT

A system and method for building a driver are disclosed. In one embodiment, the system includes one or more processors and a memory storing instructions that, when executed by the processor, cause the system to: obtain an interface description; obtain at least one mapping rule; operate a flow controller that controls a flow of operations, the operations using one or more of the interface description and the at least one mapping rule; obtain a protocol adapter; and implement access to a data source based on the operation of the flow controller using the obtained protocol adapter.

20 Claims, 14 Drawing Sheets

```
<collections
targetNamespace="http://prgs.datek.oa/type"
xmlns:coll="http://www.progress.com/oa/collections">

<collectionType name="Email_Columns" type="OAColumnType">
    <collColumnEntry name="id" userData="mp" dataType="5"/><! BIGINT >
    <collColumnEntry name="name" numericPrecision="100" userData="mp" dataType="9"/>
    <collColumnEntry name="description" numericPrecision="100" userData="mp" dataType="9"/>
    ...
    <collColumnEntry name="emailHeaderId" userData="p" dataType="5"/>
    <collColumnEntry name="emailFooterId" userData="p" dataType="5"/>
    <collColumnEntry name="emailGroupId" userData="p" dataType="5"/>
</collectionType>

<collectionType name="Email_Stats" type="OAStatType">
    <collEntry nonUnique="0" indexName="IXEMAILID" indexType="1" seqIndex="1" columnName="id"
cardinality="-1" pages="-1"... filterConditions=""/>
</collectionType>

<collectionType name="Email_PKFK" type="OAPkFkType">
    <collPkEntry PKColumnName="id" keySeq="1" updateRule="-1" deleteRule="-1" pkName="PKEMAILID"/>
</collectionType>

<collectionType name="Email" type="OATableType">
    <collTableEntry name="columns" type="oaColls:Email_Columns"/>
    <collTableEntry name="stats" type="oaColls:Email_Stats"/>
    <collTableEntry name="pkfk" type="oaColls:Email_PKFK"/>
</collectionType>

</collections>
```

Figure 11

```
<oa:service name="Eloqua" interface="tns:accounts_api">
  <oa:serviceDictionary xmlns:oa="urn:oa">
    <oa:association tableName="Account" type="oaColls:Account"/>
    <oa:mapping method="bulk">
      <oa:conditionalRuleset xmlns:mapping="http://www.progress.com/caf/mapping1.0"
                              xmlns:conditional="http://www.progress.com/caf/mapping1.0/conditional">
        <conditional:if condition="$(eloqua.bulkable)">
          <mapping:rule
            source="tns:setup_bulk_account_export,tns:bulk_start_sync,tns:bulk_poll_sync,tns
            :bulk_read_account_data,tns:bulk_delete_data,tns:bulk_delete"
            target="$(oa.operation)" type="INTERFACE_PARAM"/>
        </conditional:if>
        <conditional:elseif condition="$(oa.column['id']!=null())">
          <mapping:rule source="tns:get_data_account_id" target="$(oa.operation)"
            type="INTERFACE_PARAM"/>
        </conditional:elseif>
        <conditional:else>
          <mapping:rule source="tns:get_data_accounts" target="$(oa.operation)"
            type="INTERFACE_PARAM"/>
        </conditional:else>
      </oa:conditionalRuleset>
    </oa:mapping>
    <oa:serviceClass copy>
    </oa:conditionalCompilationRuleset>
  </oa:serviceDictionary>
  <oa:endpoint binding="tns:EloquaRestBinding">
  </oa:endpoint>
</oa:service>
```

Figure 12

```
<mapping:mapFormat>
    <mapping:property name="maxFetchBlockSize" value="1000"/>

<mapping:rule source="GET" target="${rest.verb}" type="INTERFACE_PARAM"/>
    <mapping:rule source="${oa.SessionProperty['service_URL']}/API" target="${http.uristring}"
    type="INTERFACE_PARAM"/>
    <mapping:rule source="${oa.SessionProperty['version']}"
    target="${rest.pathparam['REST/{version}/assets/contacts/{fields:version}']}" type="INTERFACE_PARAM"/>
    <mapping:rule source="application/json" target="${http.header['Content-Type']}"/>
    <mapping:rule source="gzip, deflate" target="${http.header['Accept-Encoding']}"/>
    <mapping:rule source="${eloqua.pageNumber}" target="${rest.queryparam['page']}"/>
    <mapping:rule source="${eloqua.depth}" target="${rest.queryparam['depth']}"/>
    <mapping:rule source="${eloqua.search}" target="${rest.queryparam['search']}"/>
    <mapping:rule source="${rest.queryparam['orderBy']}"/>
    <mapping:rule source="id" target="${rest.queryparam['orderBy']}"/>
    <mapping:rule source="${eloqua.pagesize}" target="${rest.queryparam['count']}"/> type="INTERFACE_PARAM"/>
</mapping:mapFormat>
```

Figure 13

DECLARATIVE DRIVER

BACKGROUND

The specification relates to building a driver.

The amount of data being generated is increasing. There has been a corresponding growth in the number and variety of data sources, including a growing number and variety of cloud data sources, to store this data. A driver, which is used by an application to access the data stored in such a data source, must be built for each data source. Therefore, an increasing number of drivers are being built.

However, existing systems and methods for building drivers fail to deliver a short turnaround time from research to delivery of the driver, fail to develop the driver using descriptive artifacts, fail to provide a protocol neutral platform for access and interaction, which includes pluggable protocol support, and are not extensible and pluggable for custom use cases.

SUMMARY

The present disclosure relates to building a driver. According to one innovative aspect of the subject matter in this disclosure, a system having one or more processors and a memory storing instructions that, when executed, cause the system to: obtain an interface description; obtain at least one mapping rule; operate a flow controller that controls a flow of operations, the operations using one or more of the interface description and the at least one mapping rule; obtain a protocol adapter; and implement access to a data source based on the operation of the flow controller using the obtained protocol adapter.

In general, another innovative aspect of the subject matter described in this disclosure may be embodied in methods that includes obtaining, using one or more processors, an interface description; obtaining, using one or more processors, at least one mapping rule; operating, using one or more processors, a flow controller that controls a flow of operations, the operations using one or more of the interface description and the at least one mapping rule; obtaining, using one or more processors, a protocol adapter; and implementing, using one or more processors, access to a data source based on the operation of the flow controller using the obtained protocol adapter.

Other implementations of one or more of these aspects include corresponding systems, apparatus, and computer programs, configured to perform the actions of the methods, encoded on computer storage devices.

These and other implementations may each optionally include one or more of the following features. For instance, the interface description includes a declarative file written in a platform/data source agnostic language. For instance, the operations may further include receiving a schema description, the schema description defining a logical schema for the data source. For instance, the operations further include receiving a set of query conditions; and receiving a definition of one or more service identification rules for the set of query conditions. For instance, the operations further include receiving a mapping rule for mapping a query from a client to a data source request; and receiving a mapping rule for mapping a data source response to a logical schema defined by a schema description. For instance, the operations further include reading the interface description; and receiving a query originating from a client. For instance, the operations further include retrieving, from the at least one mapping rule, one or more rules for mapping the query to a data source request; parsing query to get search conditions; converting the query from one semantic space to another semantic space based on one or more data mapping rules. For instance, the operations further include modifying one or more of the interface description, the at least one mapping rule and the protocol adapter that is obtained; and implementing access to a different data source.

These implementations are particularly advantageous in a number of respects. For instance, the technology described herein can rapidly build a driver for any cloud data source using declarative artifacts. It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

FIG. 11 is an example of a schema description according to one embodiment.

FIG. 12 is an example of service identification rules according to one embodiment.

FIG. 13 is an example of data mapping rules according to one embodiment.

DETAILED DESCRIPTION

Systems, methods and interfaces are disclosed. While the systems, methods and interfaces of the present disclosure are described in the context of building drivers that provide accesses to data sources, it should be understood that the systems, methods and interfaces can be applied to other contexts.

Figure 1:
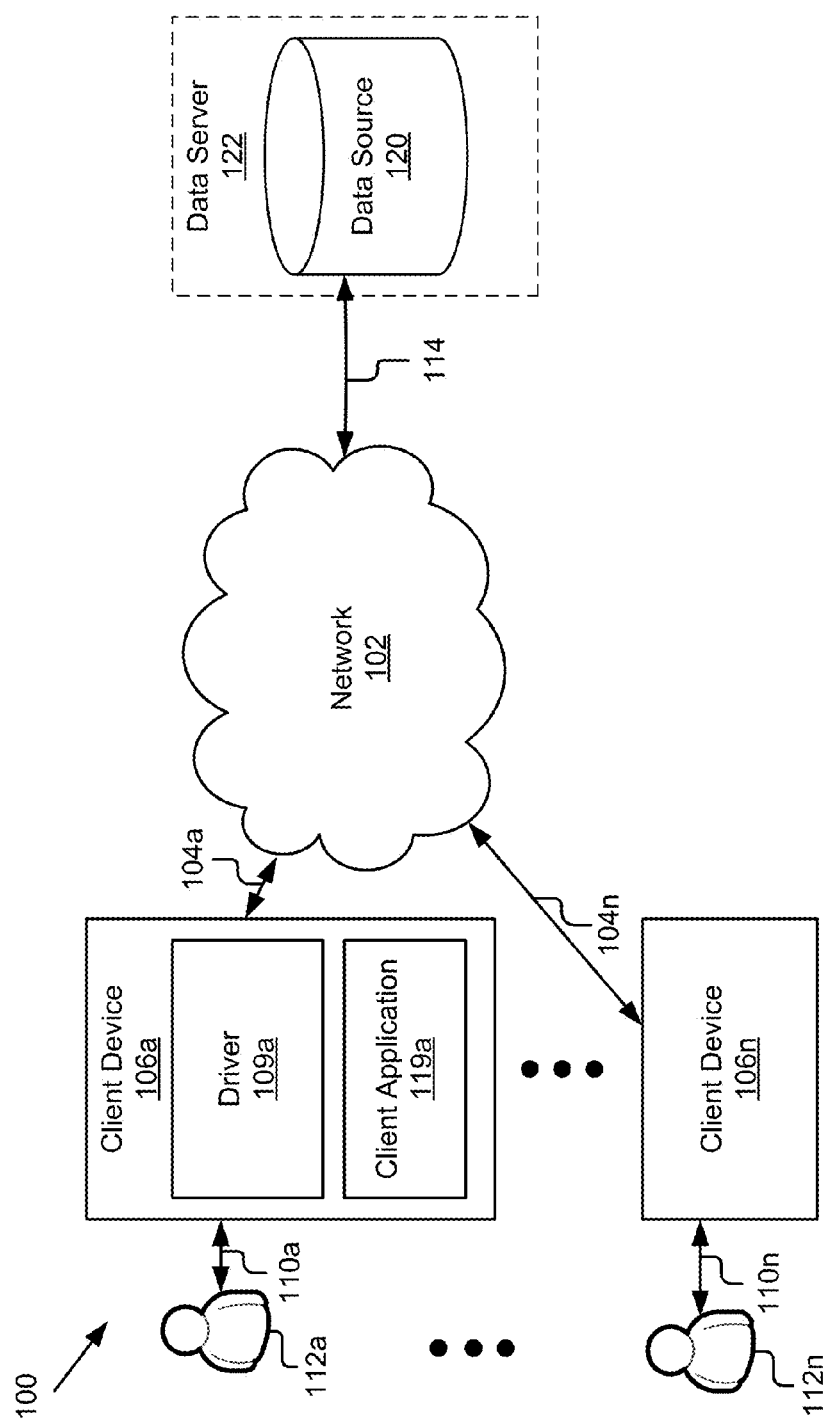
FIG. 1 is a high-level block diagram illustrating an example system for building a driver that provides accesses to data sources according to one embodiment.

FIG. 1 illustrates a high-level block diagram of a system 100 for building a driver according to one embodiment of the present disclosure. The illustrated system 100 includes client devices 106a-106n (also referred to herein individually and collectively as 106) that are accessed by users 112a-112n (also referred to herein individually and collectively as user 112) and a data source 120. In the illustrated implementation, these entities are communicatively coupled via a network 102.

The client devices 106a-106n in FIG. 1 are used by way of example. While FIG. 1 illustrates two client devices 106a and 106n, the present disclosure applies to any system architecture having one or more client devices 106. Furthermore, while only one network 102 is coupled to the client devices 106a-106n and the data source 120, in practice one or more networks 102 can be connected to these entities. Furthermore, while only one data source 120 is shown, the system 100 can include one or more data sources 120.

The client devices 106 can be one or more computing devices including one or more memory and one or more processors, for example, a laptop computer, a desktop computer, a tablet computer, a server, a mobile telephone, a personal digital assistant (PDA), a mobile email device, a portable game player, a portable music player, a television with one or more processors embedded therein or coupled thereto or any other electronic device capable of accessing a network 102. In one embodiment, the system 100 includes a combination of different types of client devices 106. For example, a combination of a personal computer and a mobile phone. As will be described below, it should be understood that the present technologies can operate on different models other than a client-server architecture. It should also be understood that although only client device 106a is illustrated as including a driver 109a and a client application 119a, each of the one or more client devices 106a-106n may include an instance of a driver 109 and a client application 119. The client device 106 according to one embodiment is described in more detail with reference to FIG. 2.

The network 102 enables communications between the client devices 106a-n and the data source 120. Thus, the network 102 can include links using technologies including, for example, Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 102 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 102 can be represented using technologies and/or formats including the hypertext markup language (HTML), the extensible markup language (XML), etc. In addition, all or some of links can be encrypted using conventional encryption technologies, for example, the secure sockets layer (SSL), Secure HTTP and/or virtual private networks (VPNs) or Internet Protocol security (IPsec). In one embodiment, the entities can use custom and/or dedicated data communications technologies instead of, or in addition to, the ones described above. Depending upon the implementation, the network 102 can also include links to other networks.

The network 102 may have any number of configurations including a star configuration, token ring configuration or other configurations. Furthermore, the network 102 may include a local area network (LAN), a wide area network (WAN) (e.g., the Internet), and/or any other interconnected data path across which multiple devices may communicate. In one embodiment, the network 102 may be a peer-to-peer network. The network 102 may also be coupled to or include portions of a telecommunications network for sending data in a variety of different communication protocols. In one embodiment, the network 102 includes short-wavelength communication networks or a cellular communications network for sending and receiving data including via short messaging service (SMS), multimedia messaging service (MMS), hypertext transfer protocol (HTTP), direct data connection, wireless application protocol (WAP), electronic messages, etc.

The data source 120 may be a non-transitory memory that stores data. For example, the data source 120 may be a dynamic random access memory (DRAM) device, a static random access memory (SRAM) device, flash memory or some other memory device. In one embodiment, the data source 120 also includes a non-volatile memory or similar permanent storage device and media, for example, a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device.

In some embodiments, the data source 120 is included in a data server 122. The data server 122 may be any class of data server including, for example, a SaaS application, packaged on-premise application, relational application, data warehouse, etc. In one embodiment, the data server 122 may include one or more computing devices having data processing, storing, and communication capabilities. For example, the data server 122 may include one or more hardware servers, server arrays, storage devices, systems, etc., and/or may be centralized or distributed/cloud-based. In some implementations, the data server 122 may include one or more virtual servers, which operate in a host server environment and access the physical hardware of the host server including, for example, a processor, memory, storage, network interfaces, etc., via an abstraction layer (e.g., a virtual machine manager). While one data server 122 is illustrated, the system 100 may include any number of data servers 122.

The data server 122 stores data in a data source 120. For example, the data server 122 may be associated with a web service such as Dropbox, Evernote, Google Docs, Microsoft SkyDrive, Salesforce, Eloqua, Hubspot, Aprimo, Marketo, Sugar CRM, Oracle's RightNow, Microsoft Dynamics, Hadoop, Hive, Amazon DynamoDB, Google Bigtable, PostgreSQL, Enterprise DB, Microsoft SQL Azure, Amazon RDS, Salesforce's database.com, Redis, Cassandra, MongoDB, CouchBase, HBase, Hive, Impala, SuccessFactors, Taleo, ADP, Workday, Intacct, Concur, NetSuite, SAP Business by Design, QAD, Infor, SAP HANA, Intuit, OData or any other web service that stores data.

A user 112 interacts with the client device 106 as represented by signal line 110. For example, the user 112 interacts with the client device 106 to provide one or more of user input to build a driver (e.g. an interface description) and user input to use the driver (e.g. a query).

It should be understood that the system 100 illustrated in FIG. 1 is representative of an example system for building a driver according to one embodiment and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 100 may be integrated into to a single computing device or system or additional computing devices or systems may be included.

Figure 2:
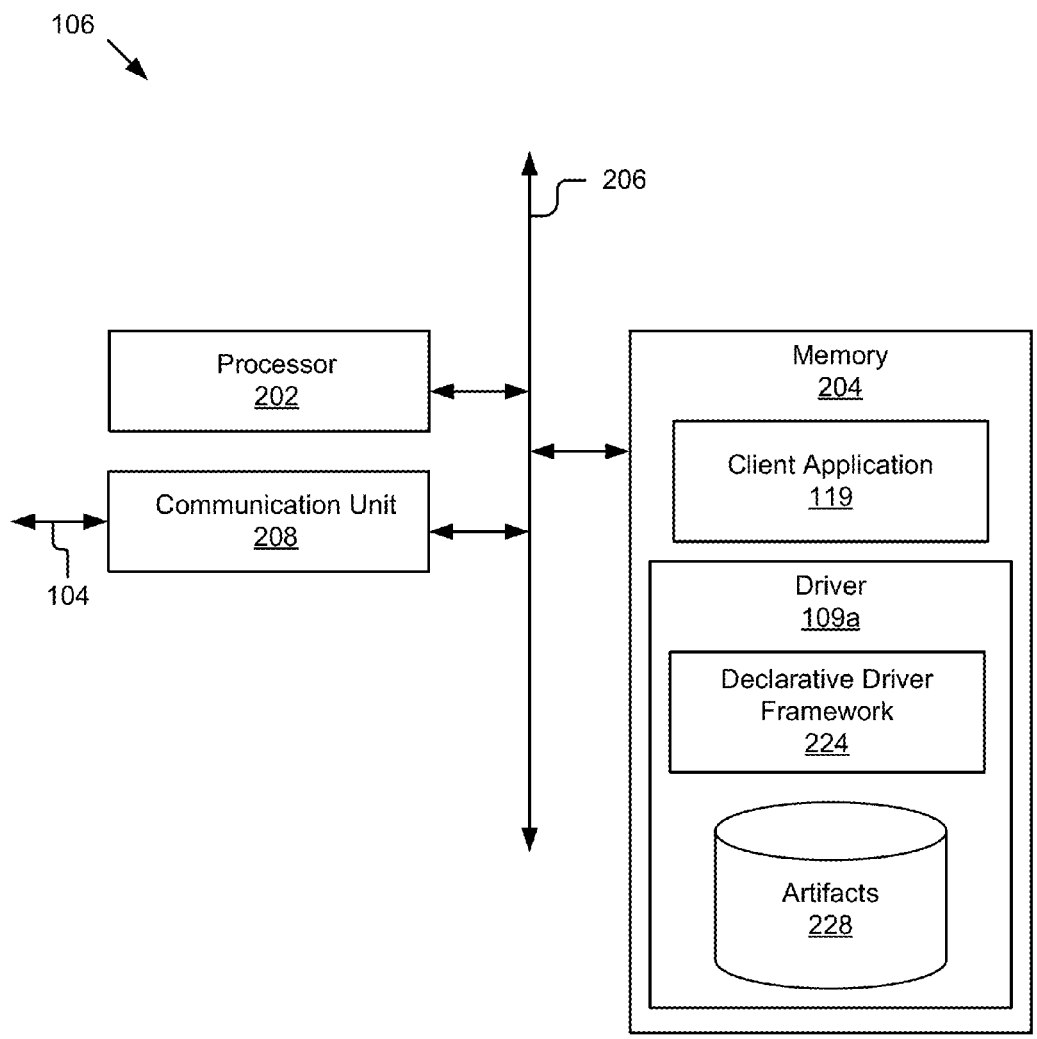
FIG. 2 is a block diagram illustrating an example computing device including a driver according to one embodiment.

FIG. 2 illustrates the client device 106 according to one embodiment of the present disclosure. In the illustrated implementations, the client device 106 includes a communication unit 208, a processor 202 and a memory 204. These components of the client device 106 are communicatively coupled to a bus 206 or software communication mechanism for communication with each other.

The communication unit 208 is coupled to the network 102 by signal line 104. The communication unit 208 is also coupled to the bus 206. The communication unit 208 transmits and receives data to and from the data source 120. The communication unit 208 provides other conventional connections to the network 102 using network protocols, e.g., TCP/IP, HTTP, HTTPS and SMTP. In some implementations, the communication unit 208 includes a port for direct physical connection to the network 102 or to another communication channel. For example, the communication unit 208 includes a USB, SD, CAT-5 or similar port for wired communication with the client device 106. In some implementations, the communication unit 208 includes a wireless transceiver for exchanging data with the client device 106 or other communication channels using one or more wireless communication methods, including IEEE 802.11, IEEE 802.16, BLUETOOTH® or another suitable wireless communication method.

The processor 202 may include an arithmetic logic unit, a microprocessor, a general purpose controller or some other processor array to perform computations and provide electronic display signals to a display device. The processor 202 is coupled to the bus 206 for communication with the other components of the client device 106. Processor 202 processes data signals and may include various computing architectures including a complex instruction set computer (CISC) architecture, a reduced instruction set computer (RISC) architecture, or an architecture implementing a combination of instruction sets. Although only a single processor 202 is shown in FIG. 2, multiple processors may be included. It should be understood that other processors, operating systems, sensors, displays and physical configurations are possible.

The memory 204 stores instructions and/or data that may be executed by the processor 202. In the illustrated implementation, the memory 204 stores the driver 109. The memory 204 is coupled to the bus 206 for communication with the other components of the client device 106. The instructions and/or data may include code for performing any and/or all of the techniques described herein. For example, in the illustrated embodiment, the memory 204 stores the driver 109, which is executed by the processor 202.

In the illustrated embodiment, the memory 204 stores a client application 119, which may use the driver 109 to access data stored on a data source 120. Depending on the embodiment, the client application may be a web browser, a desktop client, a mobile client or any other application that accesses a data source 120. The client application 119 may be written in Java, C, C++, or any other programming language.

Depending on the embodiment, the client application may use an application program interface (API) to communicate with the driver 109. For example, the client application 119 may be a Java Database Connectivity (JDBC), Open Database Connectivity (ODBC), ADO.NET, or Object Linking and Embedding Database (OLE DB) client. For clarity and convenience, the examples used herein may frequently refer to a JDBC client or an ODBC client as examples of a client application 119. However, the disclosure herein is not necessarily limited to such client applications 119.

The memory 204 includes a non-transitory computer-usable (e.g., readable, writeable, etc.) medium, which may be any apparatus or device that may contain, store, communicate, propagate or transport instructions, data, computer programs, software, code, routines, etc., for processing by or in connection with the processor 202. In some embodiments, the memory 204 may include one or more of volatile memory and non-volatile memory. For example, the memory 204 may include, but is not limited, to one or more of a dynamic random access memory (DRAM) device, a static random access memory (SRAM) device, flash memory or some other memory device. In some implementations, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. It should be understood that the memory 204 may be a single device or may include multiple types of devices and configurations.

The bus 206 can include a communication bus for transferring data between components of a client device 106 and/or between computing devices (e.g. between one or more of the client device 106 and data source 120), a network bus system including the network 102 or portions thereof, a processor mesh, a combination thereof, etc. In some implementations, the schema tool 109, its sub-components and various other software operating on the computing device 106 (e.g., an operating system, etc.) may cooperate and communicate via a software communication mechanism implemented in association with the bus 206. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

Example Driver 109

Still referring to FIG. 2, in one embodiment, the driver 109 includes a declarative driver framework 224 and artifacts 228. The driver 109 may beneficially be configured to connect to any data source 120 (e.g. any cloud-based data source) by generating descriptive artifacts 228 using the declarative driver framework 224. The declarative driver framework 224 uses the descriptive artifacts to allow the driver 109 to access the data source 120. Thus, the declarative driver framework 224 "builds" the driver 109 by generating descriptive artifacts and, along with the generated artifacts 228, comprises the driver 109.

Figure 3:
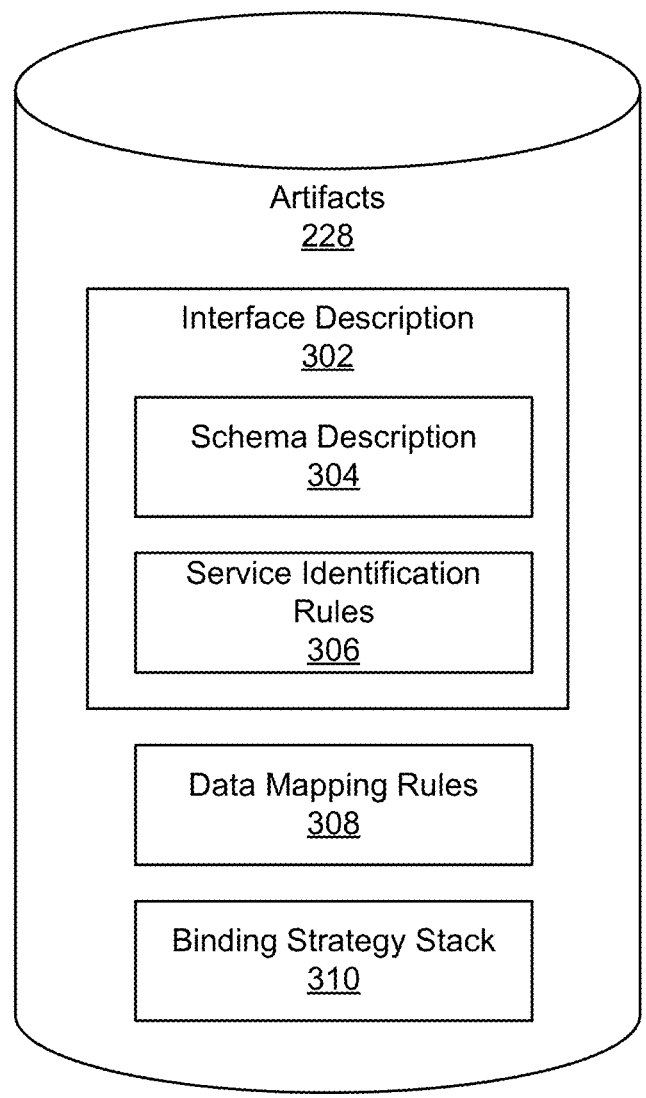
FIG. 3 is a block diagram illustrating example artifacts according to one embodiment.

Referring now to FIG. 3, an example of the artifacts 228 generated and used by the declarative driver framework 224 is shown according to one embodiment. In the illustrated embodiment, the artifacts 228 include an interface description 302, data mapping rules 308 and a binding strategy stack 310. In one embodiment, the interface description 302 includes a schema description 304 and service identification rules 306. The various artifacts 228 are discussed in detail below with reference to FIGS. 3 and 4.

The system and method disclosed herein beneficially enable the building of a driver 109 by generating a small number of files or "artifacts" 228. So, a first driver 109 instance for accessing a first data source 120 may be built by generating and using a first set of artifacts 228 associated with the first driver 109 instance, and a second driver 109 instance for accessing a second data source may be built by generating a second set of artifacts 228 associated with the second driver 109 instance. Moreover, a driver 109 for accessing a first data source 120 may be modified to access a second data source 120 instead by modifying the artifacts 228.

Figure 4:
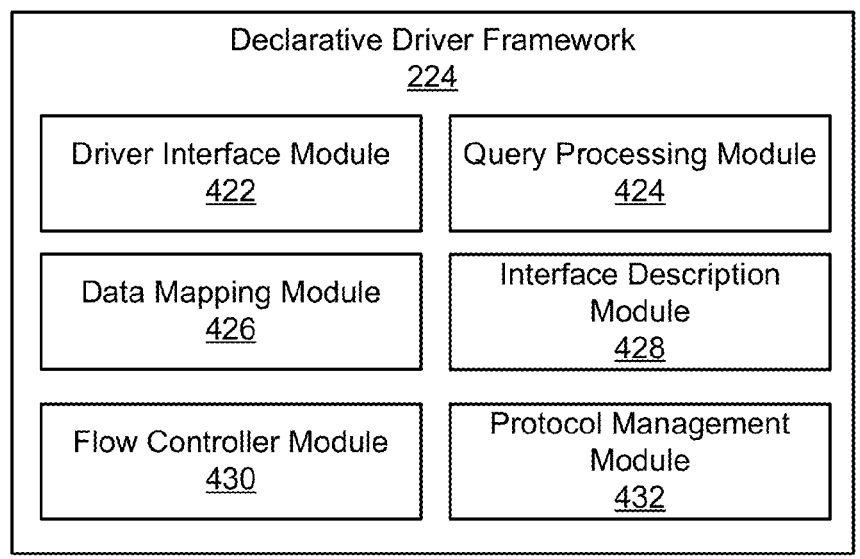
FIG. 4 is a block diagram illustrating a declarative driver framework according to one embodiment.

Referring now to FIG. 4, the declarative driver framework 224 is described in more detail according to one implementation. In one embodiment, the declarative driver framework 224 includes a driver interface module 422, a query processing module 424, a data mapping module 426, an interface description module 428, a flow controller module 430 and a protocol management module 432. Each of these components is coupled for communication with each other and the other components of the driver 109.

The driver interface module 422 can be software or routines for handling communications between the driver 109 and the client application 119. In one embodiment, the driver interface module 422 is a set of instructions executable by the processor 202. In one embodiment, the driver interface module 422 is stored in the memory 204 of the client device 106 and is accessible and executable by the processor 202. In one embodiment, the driver interface module 422 is adapted for cooperation and communication with the processor 202 and other components of the client device 106.

The driver interface module 422 handles communications between the driver 109 and the client application 119. In one embodiment, the driver interface module 422 receives a query from a client application 119 and returns results to a client application 119. For example, assume the client application 119 is a JDBC (or ODBC) client and uses structured query language (SQL); in one embodiment, the driver interface module 422 receives a SQL query from the JDBC (or ODBC) client and transmits a result using SQL to the JDBC (or ODBC) client. Query as used herein may refer to any request. Examples of queries include, but are not limited to fetching, writing, modifying, updating and inserting data stored by the data source 120 and modifying a structure stored in the data source (e.g. add/drop a table, column, relationship, etc.).

In one embodiment, the driver interface module 422 passes a query to the query processing module 424. In one embodiment, the driver interface module 422 stores the query in memory 204 (or any other non-transitory storage medium communicatively accessible), and the other modules of the declarative driver framework 224 (e.g. the query processing module 424) may retrieve the query from the memory 204 (or other non-transitory storage medium).

In one embodiment, the driver interface module 422 returns results to a client application 119. For example, in one embodiment, the driver interface module 422 passes results, which are converted by the data mapping module 426 from the semantic space of the data source 120 to that of the client application 119, to the client application 119.

The query processing module 424 can be software or routines for processing a query. In one embodiment, the query processing module 424 is a set of instructions executable by the processor 202. In one embodiment, the query processing module 424 is stored in the memory 204 of the client device 106 and is accessible and executable by the processor 202. In one embodiment, the query processing module 424 is adapted for cooperation and communication with the processor 202 and other components of the client device 106.

The query processing module 424 processes a query. In one embodiment, the query processing module 424 processes a query for use by the flow controller module 430. For example, in one embodiment, the query parsing module 424 obtains the query (e.g. from the driver interface module 422), processes the query, and sends the processed query to the flow controller module 430.

In one embodiment, processing a query may include one or more of parsing a query, validating a query and generating a query plan. Parsing a query may beneficially identify errors prior to execution of a flow controller. For example, assume, again, that the client application 119 is a JDBC (or ODBC) client and therefore the query is a SQL query. In one embodiment, the query processing module 424 parses the query and identifies the operation(s) (e.g. SQL statements) and parameters (e.g. table names, column names, values to be inserted, etc.) and determines whether the query is semantically and syntactically correct. For example, the query processing module 424 may determine the query "SELECT last name, email FROM contacts" is semantically and syntactically correct and passes the query, which may be referred to occasionally as a processed query, to the flow controller module 430, but may determine "SELECT last name" is a fragment, which is syntactically incorrect, and does not pass the query fragment to the flow controller module 430. In one embodiment, the query processing module 424 may validate the query by determining whether the client application 119 has the appropriate privileges to make such a query.

In one embodiment, the query processing module 424 passes the processed query to the flow controller module 430. In one embodiment, the query processing module 424 stores the processed query in memory 204 (or any other non-transitory storage medium communicatively accessible), and the other modules of the declarative driver framework 224 (e.g. the flow controller module 430) may retrieve the processed query from the memory 204 (or other non-transitory storage medium).

The data mapping module 426 can be software or routines for generating data mapping rules 308. In one embodiment, the data mapping module 426 is a set of instructions executable by the processor 202. In one embodiment, the data mapping module 426 is stored in the memory 204 of the client device 106 and is accessible and executable by the processor 202. In one embodiment, the data mapping module 426 is adapted for cooperation and communication with the processor 202 and other components of the client device 106.

The data mapping module 426 generates data mapping rules 308. Data mapping rules 308 may include one or more rules used to convert from one semantic space to another.

For example, assume the client application 119 is a JDBC client and the data source 120 is a cloud-based Eloqua database; in one embodiment, the data mapping module 426 uses the data mapping rules 308 to convert a SQL query (i.e. a first semantic space query) to one or more requests native to and recognizable by Eloqua (i.e. a second semantic space) and for converting a response received from Eloqua (i.e. first semantic space) into SQL results (i.e. second semantic space). In another example, the data mapping rules may convert Java objects to XML/JSON objects.

For clarity and convenience, some of the examples herein may refer to Eloqua. However, it should be noted that Eloqua is just one example of a data sources 120 and one example of a cloud based data source, which the driver 109 may be built, using the declarative driver framework 224, to access and that other data sources 120 and other cloud-based data sources exist and may be used without departing from the teachings herein.

The data mapping module 426 generates data mapping rules 308 based on user input. For example, in one embodiment, the data mapping module 426 includes an Expression Language (EL) based data mapping framework and the user inputs one or more XML based rules for manipulating data. In one embodiment, the data mapping rules 308 includes a plurality of rules and the plurality of rules may be one or more of hierarchical (to the $n^{th}$ degree), conditional, looped and grouped. An example data mapping rules 308 is shown in FIG. 13.

The mapping rules indicate how to map a query received from the client application 119 to a request for the data source 120 and a response from the data source 120 to results for the client application 119. In one embodiment, the data mapping module 426 executes one or more of the data mapping rules 308 at the direction of the flow controller module 430 to map a query (or response) from one semantic space to another. For example, assume the client application 119 is a JDBC client and the data source 120 is a cloud-based Eloqua database. Also assume that the query processing module 424 has processed the query and the flow controller module 430 using the service identification rules 306 has identified one or more services and/or operations based on the processed query. In one embodiment, the data mapping module 426 applies the data mapping rules 308 to the processed query data to convert a SQL query (i.e. a first semantic space) to a request native to and recognizable by Eloqua (i.e. a second semantic space), to invoke the identified one or more services and/or operations. The data mapping module 426 may also applydata mapping rules to convert a response subsequently received from Eloqua (i.e. a first semantic space) into SQL results (i.e. a second semantic space).

A query, or processed query, that has been mapped, or converted, by the data mapping module 426 is occasionally referred to herein as a "request" or a "data source request." In one embodiment, the data mapping rules 308 passes a request to the protocol management module 432. In one embodiment, the data mapping module 426 stores the request in memory 204 (or any other non-transitory storage medium communicatively accessible), and the other modules of the declarative driver framework 224 (e.g. the protocol management module 432) may retrieve the request from the memory 204 (or other non-transitory storage medium).

A response from a data source 120 that has been mapped, or converted, by the data mapping module 426 is occasionally referred to herein as "converted results," "mapped results" or simply as "results." In one embodiment, the data mapping rules 308 passes converted results to the flow controller module 430. In one embodiment, the data mapping module 426 stores the converted results in memory 204 (or any other non-transitory storage medium communicatively accessible), and the other modules of the declarative driver framework 224 (e.g. the flow controller module 430) may retrieve the converted results from the memory 204 (or other non-transitory storage medium).

The interface description generation module 432 can be software or routines for generating an interface description. In one embodiment, the interface description module 428 is a set of instructions executable by the processor 202. In one embodiment, the interface description module 428 is stored in the memory 204 of the client device 106 and is accessible and executable by the processor 202. In one embodiment, the interface description module 422 is adapted for cooperation and communication with the processor 202 and other components of the client device 106.

The interface description module 422 generates an interface description. In one embodiment, the interface description module 422 generates an interface description based on user 112 input. Referring now to FIG. 4, in one embodiment, an interface description 302 is one of the artifacts 228 that is generated by the declarative driver framework 224 and used by the declarative driver framework 224 to provide a client application 119 access to data stored in a data source 120. In one embodiment, an interface description 302 includes a schema description 304 file and a service identification rules 306 file including one or more service identification rules.

The schema description 304 describes a logical schema of the data source 120 the driver 109 is to access once built. For example, assume the driver 109 is being built to access Eloqua as a data source 120; in one embodiment, the schema description 304 describes the logical schema of the Eloqua database to be accessed. In one embodiment, the interface description module 422 generates the schema description by receiving user input. For example, in one embodiment, the interface description module 422 receives a schema description 304 from the user 112. In one embodiment, the interface description module 422 invokes an API associated with the data source and automatically generates a schema description using the API.

In one embodiment, the schema description 304 uses a platform/data source agnostic language. A platform/data source agnostic language is a language that does not depend on the platform (e.g. the operating system of the client device 106 and/or the type (e.g. Java, C, C++, etc.) of client application 119) and/or the data source 120 (e.g. the type data source 120, the query language used, etc.) For example, in some embodiments, the schema description 304 is written by a user 112 using the Interface Description Language (IDL) (i.e. a platform/data source agnostic language) and defines the schema of the data source 120. For example, assuming again that the driver 109 is being built to access an Eloqua database (i.e. a cloud-based data source 120); in one embodiment, the interface description module 422 receives a declarative description of the schema (e.g. the tables, table columns, indexes, relationships such as foreign key relationships between tables, etc.) of the Eloqua database in a platform/data source agnostic language. An example of at least a portion of a schema description 304 using the IDL is shown in FIG. 11.

The service identification rules 306 identify the services and/or operations that may be invoked at the data source 120. In one embodiment, the service identification rules 306 include one or more declarative rules. For example, in one embodiment, the service identification rules 306 include one or more XML based rules. In some embodiments, the service identification rules 306 support conditionality and may be modified to insert new behavior as new query conditions or data source 120 services and/or operations are introduced (e.g. through updates to the client application 119 and/or data source 120).

In one embodiment, the interface description module 422 generates the service identification rules 306 by receiving user input. For example, in one embodiment, the interface description module 422 receives a set of query conditions from the user 112 and service identification rules describing the operations/methods that should be invoked at the data source 120 when a query condition is met. For example, assuming the client application 119 is a JDBC client and the data source 120 is a Cassandra database, which is a NoSQL database, the user 112 may define query conditions such as a SQL query and/or SQL query type (e.g. SELECT, INSERT, DELETE, UPDATE, etc.) and service identification rules such as how that query or query type is invoked in Cassandra Query Language (CQL), which may require invoking one or more operations defined by the service identification rules 306.

In one embodiment, the interface description module 428 passes the interface description 302 to the flow controller module 430. In one embodiment, the interface description module 428 stores the interface description 302 in memory 204 (or any other non-transitory storage medium communicatively accessible), and the other modules of the declarative driver framework 224 (e.g. the flow controller module 430) may retrieve the interface description 302 from the memory 204 (or other non-transitory storage medium).

The flow controller module 430 can be software or routines for controlling an execution flow. In one embodiment, the flow controller module 430 is a set of instructions executable by the processor 202. In one embodiment, the flow controller module 430 is stored in the memory 204 of the client device 106 and is accessible and executable by the processor 202. In one embodiment, the flow controller module 430 is adapted for cooperation and communication with the processor 202 and other components of the client device 106.

The flow controller module 430 controls an execution flow by determining what to invoke and in what order and by supplying contextual information. For example, in one embodiment, the flow controller module 430 receives a processed query from the processing module 424, invokes the service identification rules 306 to identify an operation, invokes a binding a strategy stack 310 directing the data mapping module 426 to create a data source request and invokes the protocol management module 432 to pass the data source request and any associated data to the data source 120. In another example, the flow controller 430 receives a data source response after the protocol management module 432 has stripped the associated protocol from the response, invokes a binding strategy (e.g. a mapping binding strategy, which invokes the data mapping module 426 to convert the response into results), determines whether the results are complete and, if the results are complete, passes the results to the driver interface 422 to be sent to the client application 119. If the results are not complete, the flow controller module 430 may invoke the data mapping module 426 to create another data source request to repeat the previous operation or may invoke the service identification rules 306 to identify a different operation and invoke the data mapping module 426 to create a data source request for the next operation.

Figure 5:
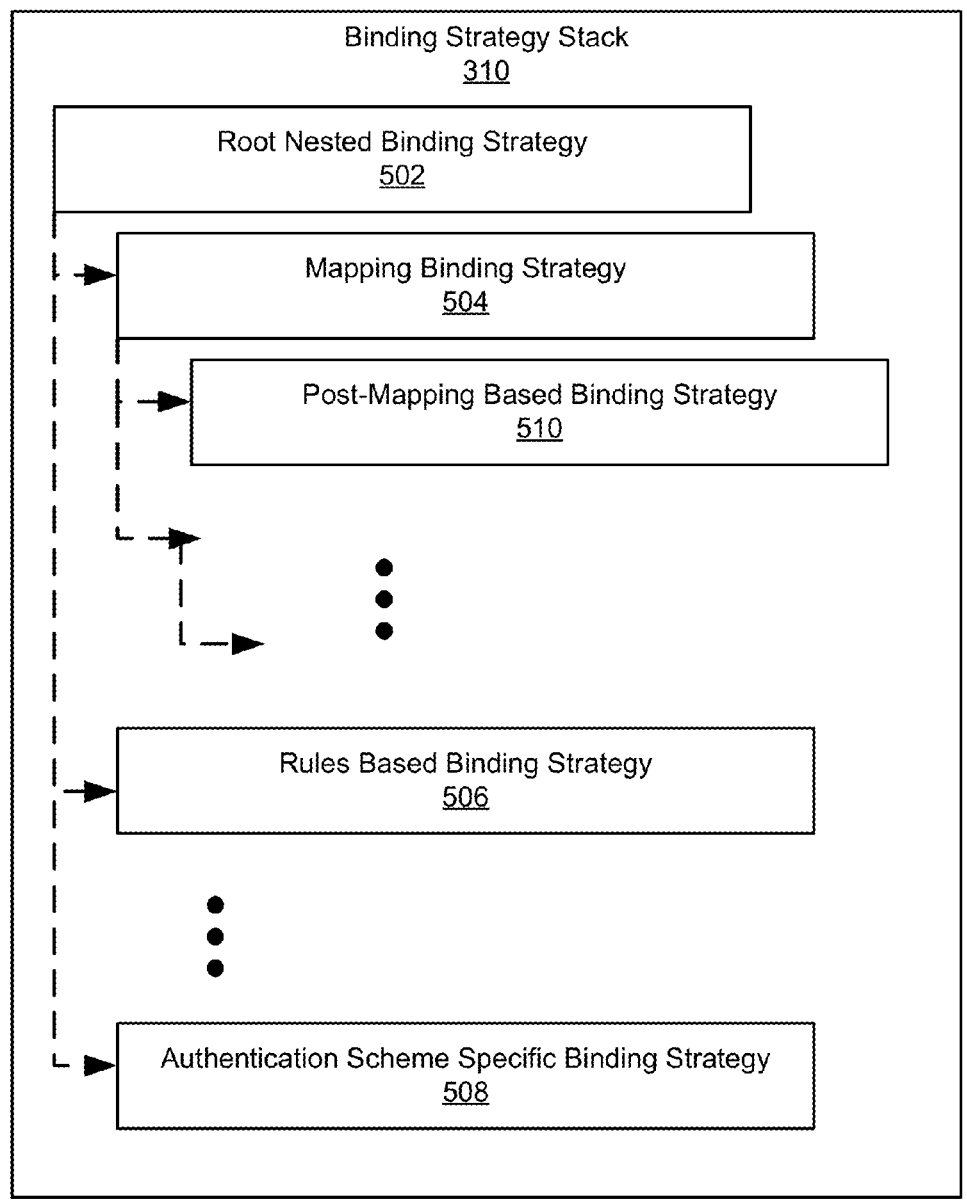
FIG. 5 is a block diagram illustrating an example bind strategy stack according to one embodiment.

In one embodiment, the flow controller module 430 invokes and executes a binding strategy stack 310. In one embodiment, the binding strategy stack 310 is a Spring Configuration file to permit the inclusion of additional binding functionality by adding an entry to the Spring Configuration file. FIG. 5 illustrates an example of a binding strategy stack 310 according to one embodiment. In one embodiment, a binding strategy stack 310 includes a root nested binding strategy 502 which includes one or more of a mapping binding strategy 504 (which may itself include a post-mapping binding strategy 510), a rules based binding strategy 506 and an authentication scheme specific binding strategy 508. The vertical ellipses in FIG. 5 indicate that any number of binding strategies may be included and nested at any level in the root nested binding strategy.

In one embodiment, the mapping binding strategy 504 commands, or "invokes," the data mapping module 426 causing the data mapping module to execute and apply the data mapping rules to map from one semantic space to another. In one embodiment, the post-mapping binding strategy 510 allows for one or more of exception handling (e.g. when an error occurs when mapping from one semantic space to another), and data beautification (e.g. data cleaning or massaging). In one embodiment, the rules based binding strategy 506 allows the binding to comply with one or more rules. For example, assume a data source 120 and/or client application 119 require as a rule that a query or a result include a certain piece of information (e.g. each query and/or result is tagged with an employee ID, session ID, user ID and password, or some other information). In one embodiment, the rules based binding strategy 506 applies that piece of information to comply with the rule. In one embodiment, an authentication scheme specific binding strategy 508 may handle any security certificates and authentication handshakes that may be required between the client application 119 and the data source 120.

As mentioned above, the flow controller module 430 may provide contextual information. For example, in one embodiment, when the flow controller 430 executes a binding strategy to create a data source request, the flow controller 430 may pass information associated with the query, i.e., contextual information. For example, assume a query is to insert data; in one embodiment, the flow controller module 430 passes the data to be inserted (i.e. contextual data from the processed query) to the data mapping module 426 and the data mapping module 426 creates the appropriate data source request.

In one embodiment, the flow controller module 430 passes the result of the binding to the driver interface module 422. For example, the flow controller module 430 determines whether mapped results received from the data mapping module 426 is complete and sends the mapped result to the driver interface module 422 to be sent to the client application 119.

The protocol management module 432 can be software or routines for managing one or more protocols for communicating with a data source 120. In one embodiment, the protocol management module 432 is a set of instructions executable by the processor 202. In one embodiment, the protocol management module 432 is stored in the memory 204 of the client device 106 and is accessible and executable by the processor 202. In one embodiment, the protocol management module 432 is adapted for cooperation and communication with the processor 202 and other components of the client device 106.

The protocol management module 432 manages one or more protocols for communicating with a data source 120.

In one embodiment, the protocol management module 432 manages the one or more protocols by determining a protocol to use and configuring the determined protocol. Depending on the data source 120 the driver 109 is built to access, the protocol may vary. For example, some cloud-based data sources may communicate using REST protocol, others may communicate using Web Services (WS) and still others may communicate using Java Messaging Service (JMS). It should be recognized that REST, WS and JMS are merely examples of protocols and that other protocols exist and may be used without departing from the disclosure herein.

In one embodiment, the protocol management module 432 determines a protocol based on a user input. For example, in one embodiment, the protocol management module 432 receives an input indicating that the data source 120 uses REST, determines to use a REST protocol and configures the REST protocol. For example, the protocol management module 432 receives a query that has been converted into the semantic space of the cloud-data source and applies the REST protocol to that query. The protocol management module 432 receives a response from the data source 120, determines the response received uses the REST protocol and strips the protocol from the response and sends the response to the data mapping module 426 to be mapped to a client result. In one embodiment, the protocol management module 432 sends the response (stripped of the protocol) to the data mapping module 426 at the direction of the flow controller module 430. In one embodiment, the driver interface module 422 passes a data source request to the data source 120 using the determined protocol. In one embodiment, the protocol management module 432 passes a data source request to the data source 120 using the determined protocol at the direction of the flow controller module 430.

In one embodiment, the protocol management module 432 can allow the interaction between a protocol and any protocol specific component. In one embodiment, the protocol management module 432 can plug any protocol specific component to interact with the protocol by providing configurability of protocol specific processors. In one embodiment, the protocol management module 432 can plug any protocol specific component to interact with the protocol by providing configurability of open-source endpoints. For example, the protocol management module 432 can build the protocol in and provide the configurability of Apache Camel endpoints.

In one embodiment, the protocol management module 432 can provide inbuilt support for one or more common protocols including, for example, REST, WS and JMS invocations. In one embodiment, the protocol management module 432 can provide integration for open source frameworks (e.g., CXF) for protocol specific invocations. The protocol management module 432 can provide inbuilt support for advanced features for these frameworks. For example, the advanced features may include WS-Security and WS Reliable Messaging.

Example Methods

Figure 6:
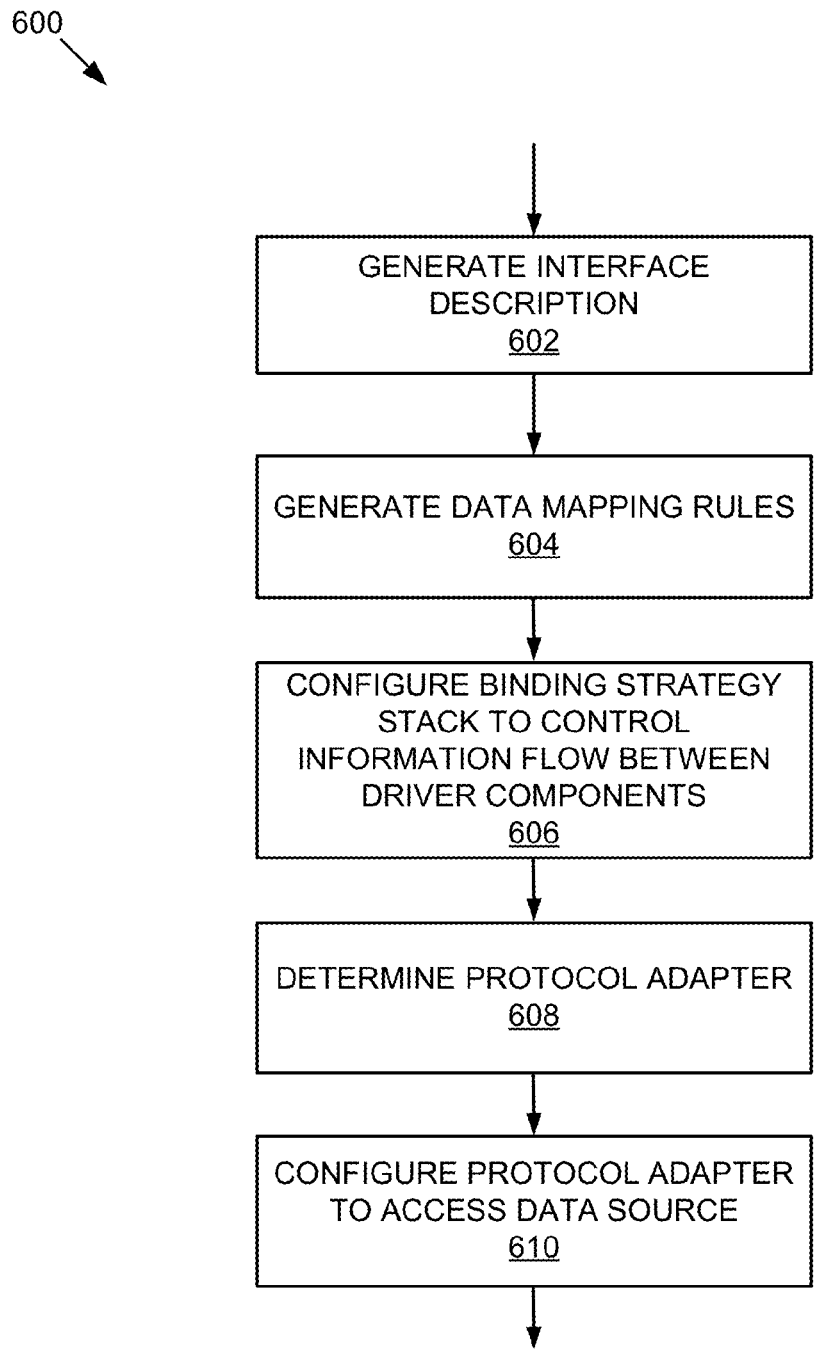
FIG. 6 is a flow chart illustrating an example method for building a driver according to one embodiment.

FIGS. 6-10 depict various methods performed by the system described above in reference to FIGS. 1-5. FIG. 6 is a flowchart of an example method 600 for building a driver according to one embodiment. The method 600 begins at block 602. At block 602, the interface description module 428 generates an interface description. At block 604, the data mapping module 426 generates data mapping rules. At block 606, the flow controller module 430 configures a binding strategy to control the flow of information between driver components. At block 608 the protocol management module 432 determines a protocol adapter and configures, at block 610, the protocol adapter.

Figure 7:
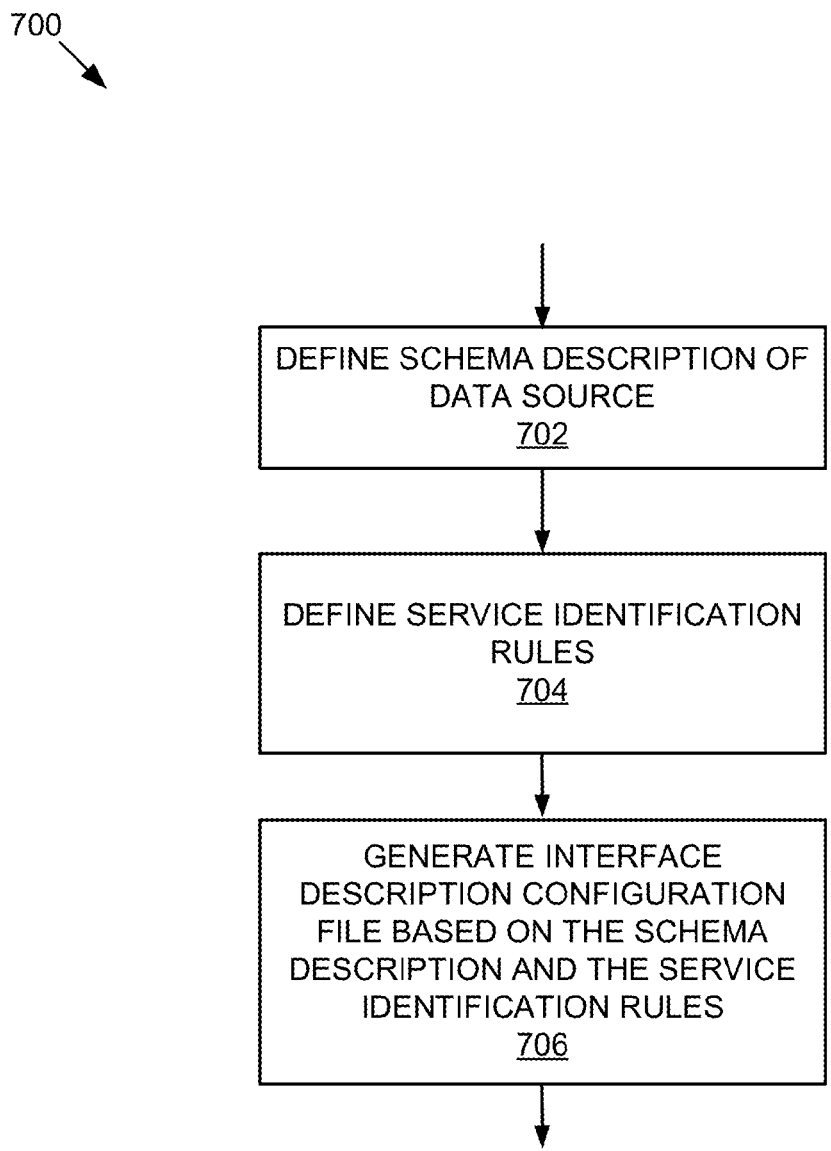
FIG. 7 is a flow chart illustrating an example method for generating an interface description according to one embodiment.

FIG. 7 is a flowchart of an example method 700 for generating an interface description according to one embodiment. The method 700 begins at block 702. At block 702, the interface description module 432 defines a schema description of a data source. At block 704, the interface description module 432 defines one or more service identification rules. At block 706, interface description module generates an interface description configuration file based on the schema description and the one or more service identification rules.

Figure 8A:
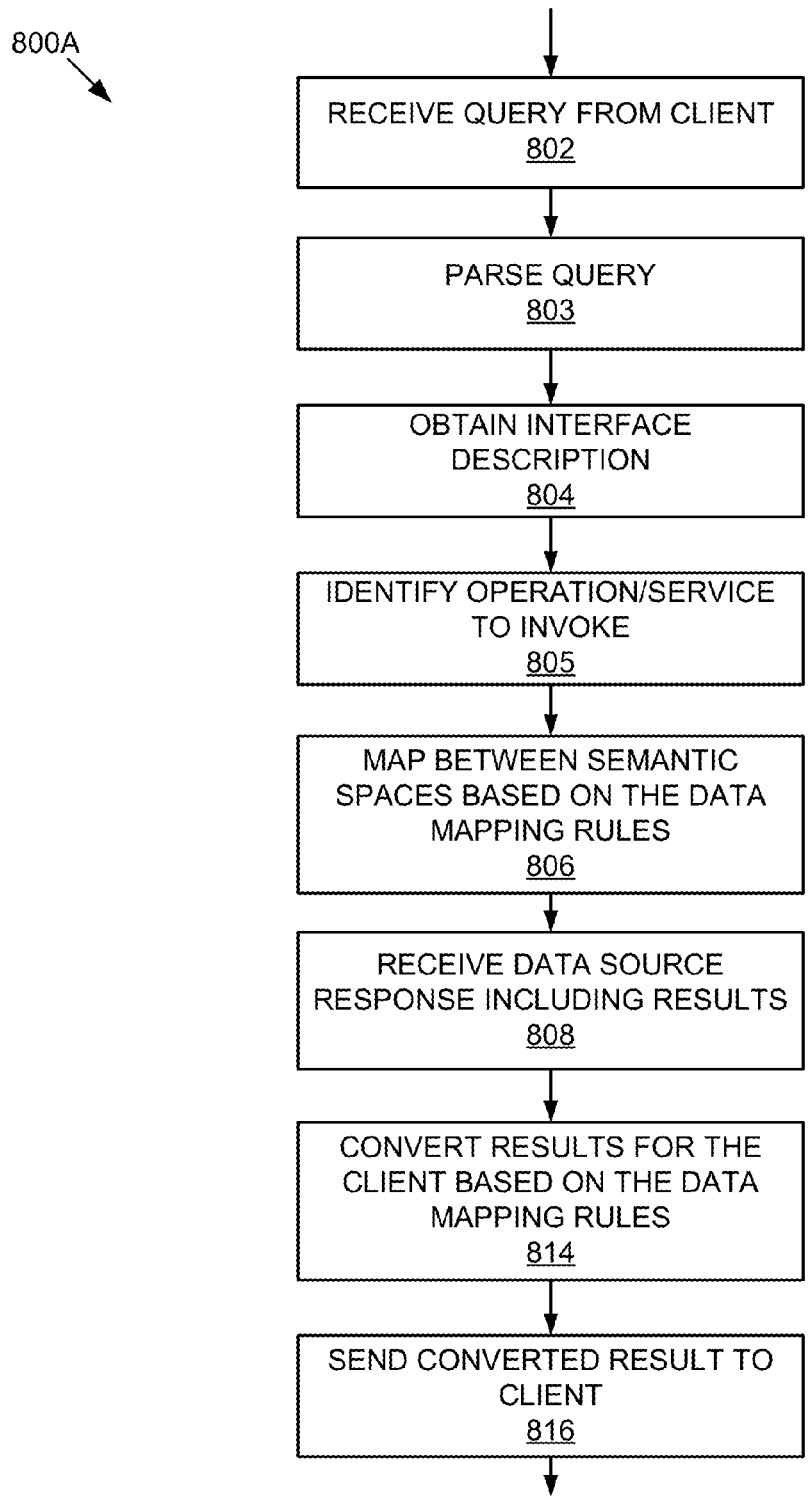
FIG. 8A is a flow chart illustrating an example method for the run-time operation of the driver according to one embodiment.

FIG. 8A is a flowchart of an example method 800A for the runtime operation of a driver 109 according to one embodiment. The method 800A begins at block 802. At block 802, the driver interface module 422 receives a query from the client. At block 803, the query processing module 424 parses the query. At block 804, the flow controller module 430 obtains an interface description. At block 805, the flow controller module 430 identifies and operations/service to invoke using the one or more service identification rules included in the interface description. At block 806, the data mapping module 426 maps between semantic spaces based on the data mapping rules. At block 808, the protocol management module 432 receives a data source response including results. At block 814, the data mapping module 426 converts the results received at block 808 for the client based on the data mapping rules. At block 816, the driver interface module 422 since the converted results to the client.

Figure 8B:
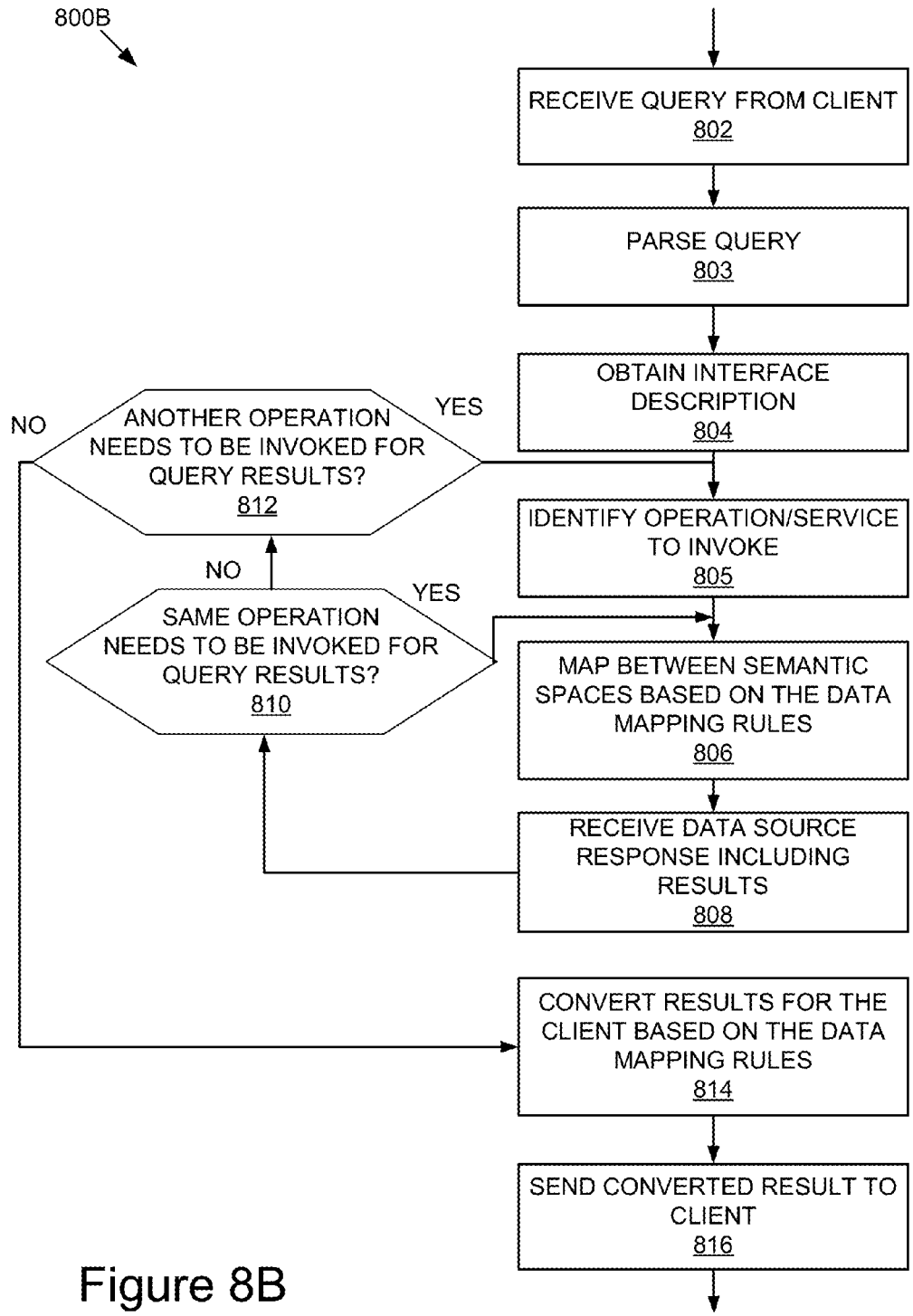
FIG. 8B is a flow chart illustrating an example method for the run-time operation of the driver according to another embodiment.

FIG. 8B is a flowchart of an example method 800B for the runtime operation of a driver 109 according to another embodiment. The method 800B begins at block 802. At block 802, the driver interface module 422 receives a query from the client. At block 803, the query processing module 424 parses the query. At block 804, the flow controller module 430 obtains an interface description. At block 805, the flow controller module 430 identifies and operations/service to invoke using the one or more service identification rules included in the interface description. At block 806, the data mapping module 426 maps between semantic spaces based on the data mapping rules. At block 808, the protocol management module 432 receives a data source response including results.

At block 810, the flow controller module 430 determines whether the same operation needs to be invoked to receive query results based on the parsed query and one or more service identification rules. When the flow controller module 430 determines that the same operation needs to be invoked to receive query results (810—Yes), the method 800B continues at block 806 and block 806, 808 and 810 may be repeated until the flow controller module 430 determines that the same operation does not need to be invoked to receive query results (810—No). When the flow controller module 430 determines that same operation does not need to be invoked to receive query results (810—No), the method 800B continues at block 812.

At block 812, the flow controller module 430 determines whether another operation needs to be invoked to receive query results based on the parsed query and one or more service identification rules. When the flow controller module 430 determines that another operation needs to be invoked to receive query results (812—Yes), the method 800B continues at block 805 and block 805, 806, 808 and 810 may be repeated until the flow controller module 430 determines that another operation does not need to be invoked to receive query results (812—No). When the flow controller module 430 determines that another operation does not need to be invoked to receive query results (812—No), the method 800B continues at block 814.

At block 814, the data mapping module 426 converts the results for the client based on the data mapping rules. At block 816, the driver interface module 422 sends the converted results to the client.

Figure 9:
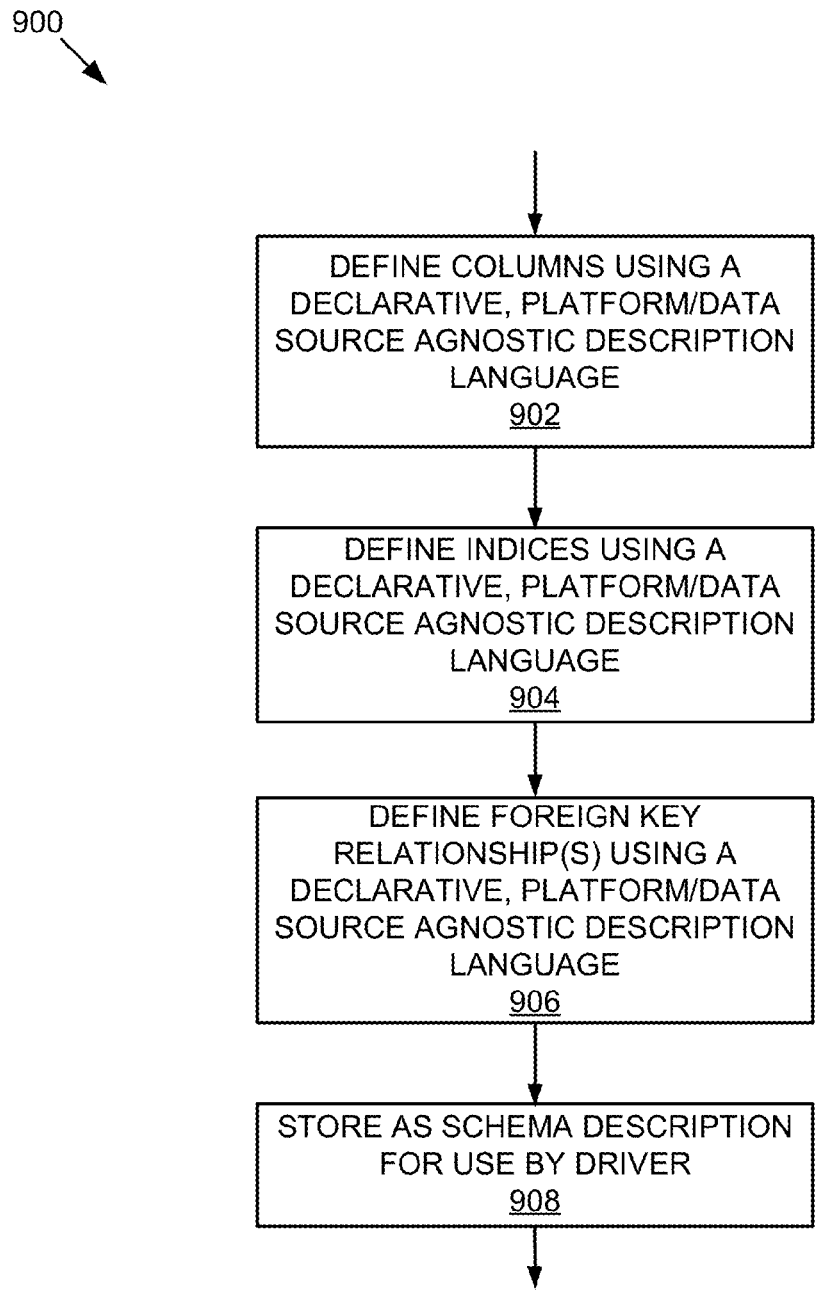
FIG. 9 is a flow chart illustrating an example method for generating a schema description according to one embodiment.

FIG. 9 is a flowchart of an example method 900 for generating a schema description according to one embodiment. The method 900 begins at block 902. At block 902, the interface description module 428 defines columns using a declarative, platform/data source agnostic description language. At block 904, the interface description module 428 defines indices using a declarative, platform/data source agnostic description language. At block 906, the interface description module 428 defines one or more foreign key relationships using a declarative, platform/data source agnostic description language. At block 908 the interface description module 428 stores the definitions of blocks 902, 904 and 906 for use by the driver 109.

Figure 10:
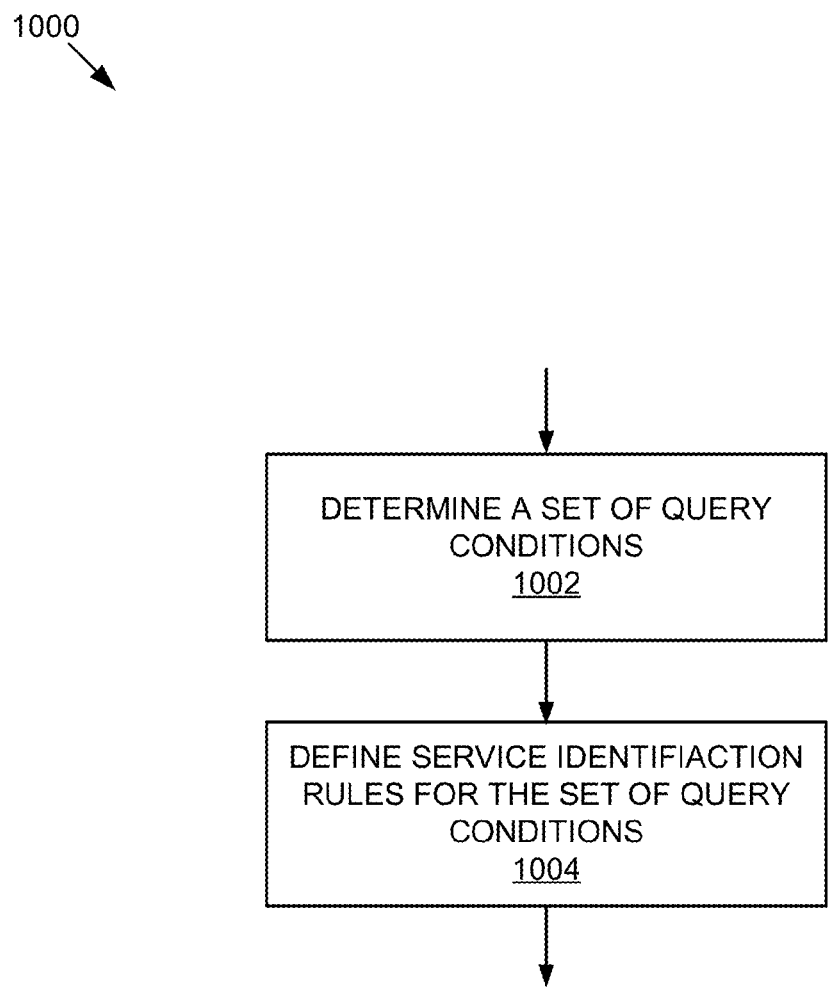
FIG. 10 is a flow chart illustrating an example method for generating service identification rules according to one embodiment.

FIG. 10 is a flowchart of an example method 1000 for generating one or more service identification rules according to one embodiment. Method 1000 begins at block 1002. At block 1002 the interface description module 428 determines a set of query conditions. At block 1004 the interface description module 428 defines one or more service identification rules for the set of query conditions.

In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that may receive data and commands, and to any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein may take the form of an entirely hardware implementation, an entirely software implementation, or implementations containing both hardware and software elements. For instance, the technology may be implemented in software, which includes but is not limited to firmware, resident software, microcode, etc.

Furthermore, the technology may take the form of a computer program product accessible from a computer-usable or computer-readable medium providing program code for use by or in connection with a computer or any instruction execution system. For the purposes of this description, a computer-usable or computer readable medium may be any non-transitory storage apparatus that may contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements may include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure may be implemented as software, hardware, firmware, or any combination of the foregoing. Also, wherever a component, an example of which is a module, of the specification is implemented as software, the component may be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
   obtaining, using one or more processors, an interface description during declarative driver framework based creation of a driver to access a cloud-based data source;
   obtaining, using one or more processors, during declarative driver framework based creation of the driver to access the cloud-based data source, at least one mapping rule for converting a query from a first semantic space associated with a client and using a first formal language to a second semantic space associated with the cloud-based data source that stores data associated with the query, wherein the cloud-based data source may or may not use a formal language;
   the driver operating a flow controller that controls a flow of operations, the operations using one or more of the interface description and the at least one mapping rule, wherein the flow of operations includes converting the query from the first semantic space associated with the client and using the first formal language to the second semantic space associated with the cloud-based data source that stores data associated with the query;
   obtaining, using one or more processors, a protocol adapter during declarative driver framework based creation of the driver to access the cloud-based data source; and
   the driver implementing access to a data source based on the operation of the flow controller using the obtained protocol adapter.

2. The method of claim 1, wherein the interface description includes a declarative file written in a platform or data source agnostic language.

3. The method of claim 1, wherein obtaining the interface description comprises:
   receiving a schema description, the schema description defining a logical schema for the cloud-based data source.

4. The method of claim 1, wherein obtaining the interface description comprises:
   receiving a set of query conditions; and
   receiving a definition of one or more service identification rules for the set of query conditions.

5. The method of claim 1, wherein obtaining the at least one data mapping rule comprises:
   receiving a mapping rule for mapping a query from a client to a data source request; and
   receiving a mapping rule for mapping a data source response to a logical schema defined by a schema description.

6. The method of claim 1, comprising:
   reading the interface description; and
   receiving a query originating from a client.

7. The method of claim 6, wherein operating the flow controller comprises:
   retrieving, from the at least one mapping rule, one or more rules for mapping the query to a data source request;
   parsing query to get search conditions;
   converting the query from one semantic space to another semantic space based on one or more service identification rules.

8. The method of claim 1, further comprising:
   modifying one or more of the interface description, the at least one mapping rule and the protocol adapter that is obtained; and
   implementing access to a different data source.

9. A system comprising:
   a processor; and
   a memory storing instructions that, when executed, cause the system to:
      obtain an interface description during declarative driver framework based creation of a driver to access a cloud-based data source;
      obtain, during the declarative driver framework based creation of the driver to access the cloud-based data source, at least one mapping rule for converting a query from a first semantic space associated with a client and using a first formal language to a second semantic space associated with the cloud-based data source that stores data associated with the query, wherein the cloud-based data source may or may not use a formal language;
      operate a flow controller that controls a flow of operations, the operations using one or more of the interface description and the at least one mapping rule, wherein the flow of operations includes converting the query from the first semantic space associated with the client and using the first formal language to the second semantic space associated with the cloud-based data source that stores data associated with the query;

obtain a protocol adapter during the declarative driver framework based creation of the driver to access the cloud-based data source; and implement access to the cloud-based data source based on the operation of the flow controller using the obtained protocol adapter.

10. The system of claim 9, wherein the interface description includes a declarative file written in a platform or data source agnostic language.

11. The system of claim 9, wherein the instructions stored in the memory that, when executed, cause the system to obtain the interface description comprise:

instructions stored in the memory that, when executed, cause the system to:

receive a schema description, the schema description defining a logical schema for the cloud based data source.

12. The system of claim 9, wherein the instructions stored in the memory that, when executed, cause the system to obtain the interface description comprise:

instructions stored in the memory that, when executed, cause the system to:

receiving a set of query conditions; and receiving a definition of one or more service identification rules for the set of query conditions.

13. The system of claim 9, wherein the instructions stored in the memory that, when executed, cause the system to obtain the at least one data mapping rule comprise:

instructions stored in the memory that, when executed, cause the system to:

receive a mapping rule for mapping a query from a client to a data source request; and receive a mapping rule for mapping a data source response to a logical schema defined by a schema description.

14. The system of claim 9, wherein the instructions stored in the memory further include instructions that, when executed, cause the system to:

read the interface description; and receive a query originating from a client.

15. The system of claim 14, wherein the instructions stored in the memory further include instructions that, when executed, cause the system to:

retrieve from the at least one mapping rule, one or more rules for mapping the query to a data source request;

parse a query to get search conditions;

convert the query from one semantic space to another semantic space based on one or more service identification rules.

16. The system of claim 9, wherein the instructions stored in the memory further include instructions that, when executed, cause the system to:

modify one or more of the interface description, the at least one mapping rule and the protocol adapter that is obtained; and implement access to a different data source.

17. A computer program product comprising a computer usable medium including a computer readable program, wherein the computer readable program when executed on a computing device causes the computing device to:

obtain an interface description during declarative driver framework based creation of a driver to access a cloud-based data source;

obtain, during the declarative driver framework based creation of the driver to access the cloud-based data source, at least one mapping rule for converting a query from a first semantic space associated with a client and using a first formal language to a second semantic space associated with the cloud-based data source that stores data associated with the query, wherein the cloud-based data source may or may not use a formal language;

operate a flow controller that controls a flow of operations, the operations using one or more of the interface description and the at least one mapping rule, wherein the flow of operations includes converting the query from the first semantic space associated with the client and using the first formal language to the second semantic space associated with the cloud-based data source that stores data associated with the query;

obtain a protocol adapter during the declarative driver framework based creation of the driver to access the cloud-based data source; and implement access to the cloud based data source based on the operation of the flow controller using the obtained protocol adapter.

18. The computer program product of claim 17 wherein the computer readable program when executed on a computing device causes the computing device to:

receive a schema description, the schema description defining a logical schema for the cloud-based data source.

19. The computer program product of claim 17 wherein the computer readable program when executed on a computing device causes the computing device to:

receiving a set of query conditions; and receiving a definition of one or more service identification rules for the set of query conditions.

20. The computer program product of claim 17 wherein the computer readable program when executed on a computing device causes the computing device to:

receive a mapping rule for mapping a query from a client to a data source request; and receive a mapping rule for mapping a data source response to a logical schema defined by a schema description.

* * * * *